United States Patent

Gundlach

[15] 3,670,840
[45] June 20, 1972

[54] FLEXIBLE SEISMIC GAS EXPLODER
[72] Inventor: William J. Gundlach, Fulshear, Tex.
[73] Assignee: Geo Space Corporation
[22] Filed: Aug. 6, 1969
[21] Appl. No.: 847,828

[52] U.S. Cl. .................................. 181/0.5 NC, 181/0.5 R
[51] Int. Cl. ........................................................ G01v 1/00
[58] Field of Search .............................................. 181/0.5 IC

[56] References Cited

UNITED STATES PATENTS

| | | | |
|---|---|---|---|
| 3,380,551 | 4/1968 | Lang | 181/0.5 IC |
| 3,422,447 | 1/1969 | Kilmer | 181/0.5 IC |
| 3,480,102 | 11/1969 | Kilmer | 181/0.5 IC |

Primary Examiner—Benjamin A. Borchelt
Attorney—Michael P. Breston and Alfred B. Levine

[57] ABSTRACT

This invention relates to a repetitive seismic energy source and includes a rigid combustion chamber coupled to a flexible gas supply system for supplying to the chamber a pressurized combustible gas mixture. A piston normally maintains the chamber gas tight. Simultaneously with the ignition of the gas mixture, the piston becomes accelerated away from an outlet of the chamber to abruptly release high-temperature, high-pressure gases into the surrounding water, the underlying earth crust of which is being seismically explored. The displacement of the piston is caused by the combustion of the gas mixture in the combustion chamber.

12 Claims, 6 Drawing Figures

3,670,840

William J. Gundlach
INVENTOR

BY    Michael P. Breston

ATTORNEY

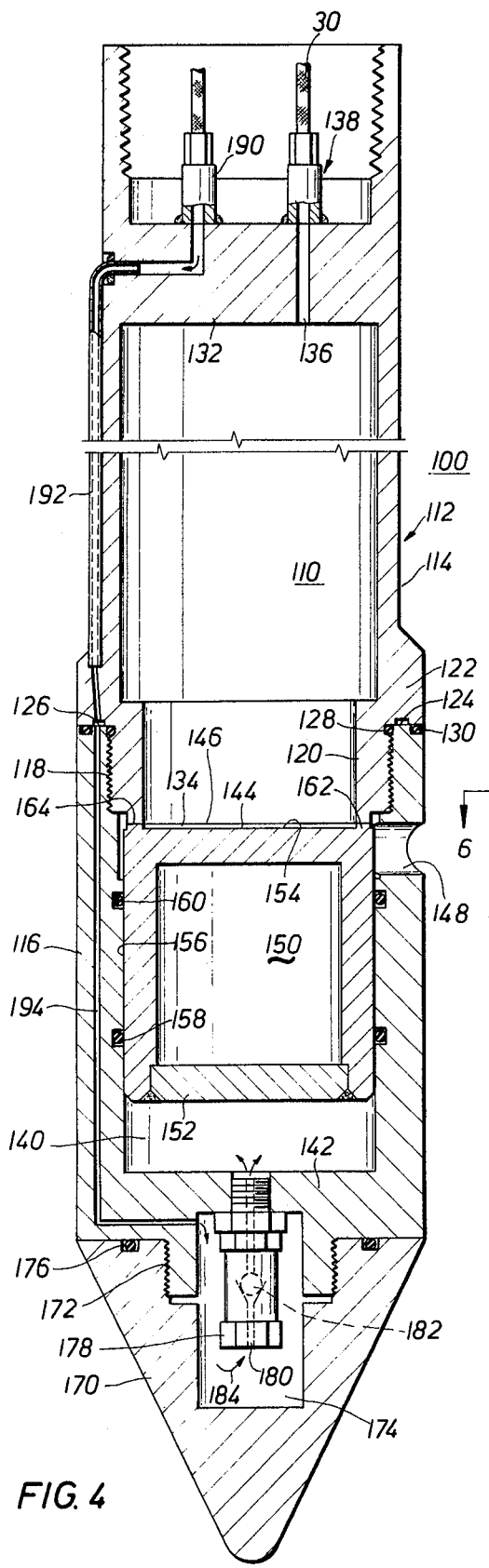

FLEXIBLE SEISMIC GAS EXPLODER

BACKGROUND OF THE INVENTION

Several types of seismic energy sources have been described in the technical literature. In one such system, the seismic disturbances are generated by repetitively detonating a combustible gas mixture in a chamber having an open end directly coupled to the water. In another system, a mixture of high-pressure air and diesel fuel is confined in the chamber and after ignition, high-pressure gases are released to the water by a complex controllable valve means.

These and other known systems have certain drawbacks which make their use undesirable in areas where heavy compressors cannot be hauled. Moreover, the valve means for controlling the abrupt release of the high-pressure gases into the water has too many moving parts and requires frequent field adjustments and overhauls. Such exploders are structurally weak and break down. To provide for such overhauls, the seismic crew frequently carries one or more spare gas exploders.

While the open-ended gas exploders may theoretically operate adequately in deep waters where the ambient pressures are relatively high, their usefulness is severely limited in shallow waters and marshy terrains.

SUMMARY OF THE INVENTION

In accordance with the present invention there is provided a relatively light-weight, flexible gas exploder especially useful in seismic surveying of relatively shallow waters and marshy terrains. The source comprises a housing having a combustion or primary chamber and a secondary chamber. The housing is formed of rigid wall structure. A piston displaceable in the secondary chamber normally closes an outlet end in the primary chamber. When the piston is in a closed position, a combustible gas mixture is introduced into the combustion chamber. The secondary chamber includes bias means to normally urge the piston to its closed position. Substantially simultaneously with the detonation of the confined gases in the primary chamber, the resulting high-pressure gases rapidly accelerate the piston away from its closed position to its fully-open position thereby allowing the abrupt release of high-temperature, high-pressure gases into the fluid medium surrounding the housing. This sudden release of high-pressure gases generates the desired acoustic pulse. The piston moves from its open-position to its closed position in time to prevent water from entering the combustion chamber.

In accordance with one aspect of the present invention the secondary chamber has one closed end, and the piston sealingly slides over the inner cylindrical wall of the secondary chamber. An inert gas is admitted into the secondary chamber to normally maintain the piston in its closed position with the combustion chamber. Following the displacement of the piston from its closed position to its fully-open position, the inert gas in the secondary chamber becomes compressed thereby cushioning the impact of the piston on the exploder housing.

In a more specific aspect of this invention, the housing is cylindrical in form and the piston's upper face normally maintains the outlet of the primary chamber closed. The piston slides on the cylindrical inner wall of the secondary chamber following the detonation of the combustible gas mixture in the primary chamber. A suitable check valve admits nitrogen gas into the secondary chamber which is formed by the structural wall of the housing and the lower face of the piston. Following ignition, the compressed nitrogen between the bottom face of the piston and the walls of the secondary chamber prevents the piston from damaging the housing and urges the piston to its normally closed position. A plurality of discharge ports extend through the wall of the housing. The ports communicate with the outlet end of the primary chamber to allow for the complete, substantially-instantaneous release of the high-pressure gases into the fluid medium.

A more complete understanding of the present invention will be had following the detailed description when taken in connection with the accompanying drawings.

BRIEF DESCRIPTION OF THE DRAWINGS

FIG. 4 is a view in cross-section of a preferred gas exploder of this invention;

FIG. 5 is an enlarged view of the lower end of the exploder of FIG. 4; and

FIG. 6 is a top view taken on line 6—6 in FIG. 5.

Referring now to FIG. 1 a source 10 of oxidizer gas supplies oxygen to an input line 14 and a source 12 of fuel gas such as propane feeds an input line 16. Tube 14 is connected through a strainer 36, an orifice 38, a solenoid-operated valve 40, a check valve 42, a pipe 44, a T-coupler 46, a pipe 48 to the inlet port 51 of an assembly block 50. A suitable opening 52 through the block 50 allows the gases to enter through an outlet port 56 into a gas-mixer or turbulator assembly 54.

Figure 1:
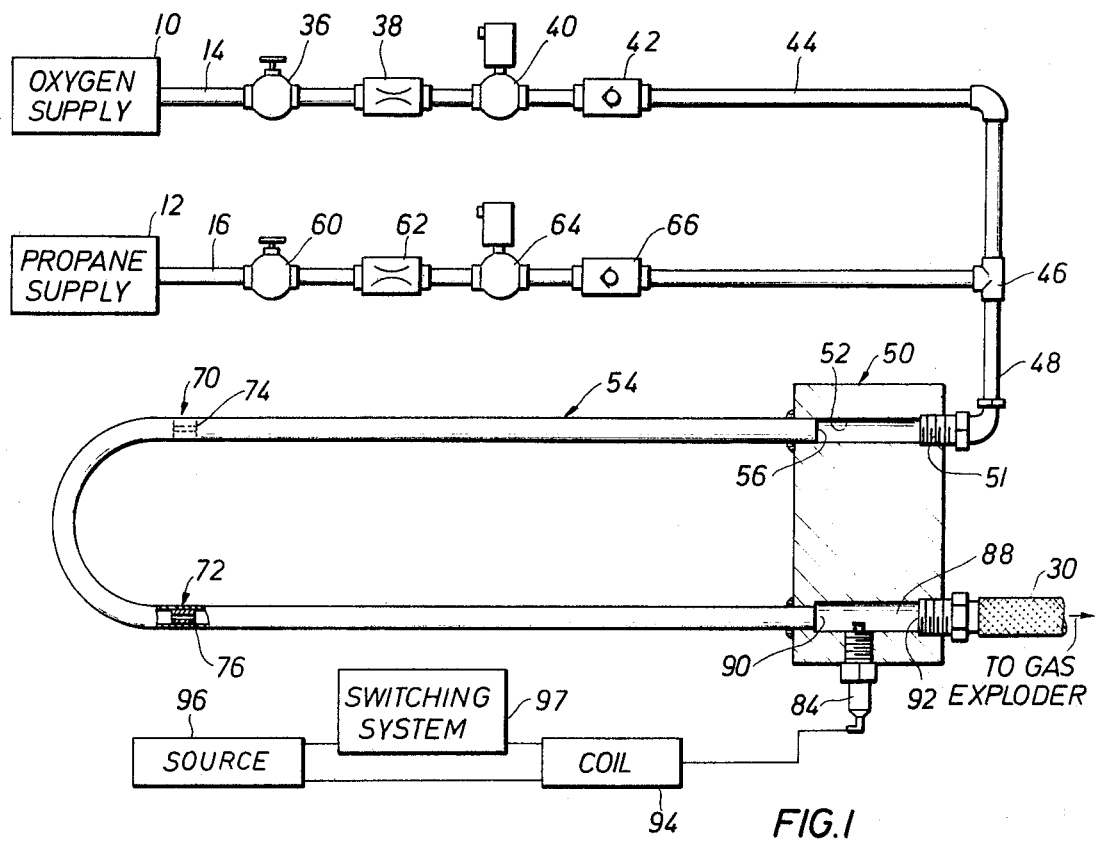
FIG. 1 shows a combustible mixture supply system for feeding to the combustion chamber a combustible gas mixture through a flexible conduit and for sending a detonation wave through the conduit.

The other input line 16 feeds into the T-coupler 46, also through a strainer 60, and orifice 62, a solenoid-operated valve 64, and a check valve 66. The strainers prevent the collection of foreign matter in the gas-flow-proportioning orifices 38, 62. These orifices have suitable relative throat sizes, which may be adjusted if desired, to provide a predetermined detonating mixture into the turbulator 54. The solenoid-operated valves 40, 64 have suitable pressure and volume transmission capabilities. The check valves 42, 66 may be of the spring-loaded type capable of withstanding the peak back pressures of the detonating shock waves, thereby preventing damage to the relatively fragile, low-pressure solenoid valves 40, 64.

Figure 2:
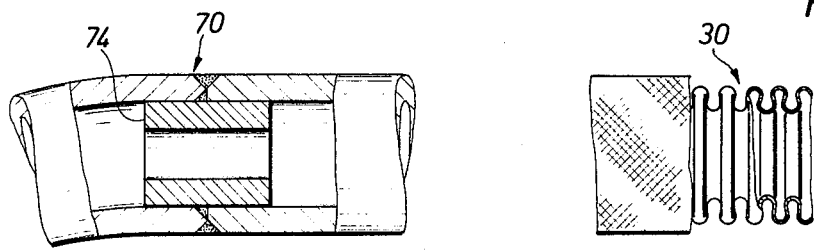
FIGS. 2 and 3 are enlarged detail views of portions of the system of FIG. 1.

The main function of turbulator 54 is to allow for the complete mixing of the fuel and oxidizer gases. A suitable turbulator can be made of inexpensive tubing, for example, in U-shaped form. Two restrictions 70, 72 are arranged by inserting two hollow tubular inserts 74, 76, respectively, as shown in FIG. 2. Experimentally, the diameters of the orifices in inserts 74, 76 are determined for optimum turbulence and hence mixing of the incoming gases.

For remote firing any desired ignitor system may be employed. For simplicity, a spark plug 84 is shown mounted in the bottom wall of the assembly mounting block 50. The electrodes of spark plug 84 are exposed to an internal passageway 88 coupling an inlet port 90 to an outlet port 92 which is connected to a flexible conduit or tube 30. Connected to spark plug 84 is an ignition coil 94 energized by an electrical source 96 through a suitable switching system 97.

Figure 3:
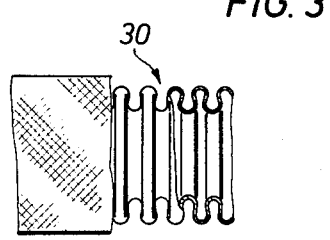

Flexible tube 30 may be of the type known in the trade as corrugated metal hose series 400 SS and made for example by Flexonics. The flexible pipe 30 has a bellows-type construction as shown in FIG. 3 and is fabricated from stainless steel with close pitch annular corrugations. The hose has a maximum working pressure range specified by the manufacture from full vacuum to 4,500 psig depending on size. It can withstand temperatures up to 1,500° F. Other flexible pipes could be employed and for some applications plastic pipes made for example of suitably reinforced teflon could also be used.

In operation of the system shown in FIG. 1 the pressures of the oxidizer and fuel gases in lines 14 and 16 are adjusted to about the same value. The operating pressure is, of course, determined by the fuel supply system characteristics such as tubing size, valve port areas, etc., by the fuel volume requirements of the combustion chamber itself, and by the time available for filling the combustion chamber between successive combustions.

With fuel and oxidizer pressures established, the solenoid valves 40 and 64 are opened, permitting fuel and oxidizer gases to flow through the check valves 42, 66, respectively, and through the T-coupling 46, line 48, opening 52 in the mounting block 50, and into the turbulator assembly 54. In the turbulator assembly 54 the restrictions 70 and 72 cause the gases to become thoroughly mixed. From assembly 54 the gases are admitted directly into the combustion chamber through the flexible pipe 30. Valves 40 and 64 are held open until the combustion chamber is fully filled at which time the valves are closed and the mixture ignited by actuating switching system 97.

Upon becoming ignited at the electrodes of spark plug 84, a detonation shock wave is formed and moved downwardly through the flexible pipe 30 into the gas exploder where it detonates the mixture of fuel and oxidizer charge.

The detonation shock wave also moves in a direction opposite from that of the flexible tube 30 toward turbulator 54 and the connecting fuel supply line system until it reaches check valves 42 and 66. The check valves which are normally closed protect the relatively low-pressure, solenoid-operated valves and the remaining parts of the supply fuel line system. After the charge in the combustion chamber becomes detonated and the gaseous products of combustion exhausted, the solenoid valves 40 and 64 may be re-opened to supply a fresh charge of thoroughly mixed gases into the combustion chamber for the next cycle of operation.

Referring now to FIGS. 4–6, a preferred embodiment of a gas exploder of the present invention, generally designated as 100, for generating acoustic waves into a fluid medium, such as water, marshy terrain or mud, includes a combustion or primary chamber 110 formed within the walls of a rigid housing generally designated as 112. For convenience housing 112 is preferably made of generally tubular construction in two sections: an upper section 114 and a lower section 116 threadedly coupled together as shown at 118. A throat portion 120 of section 114 extends inwardly into section 116. An enlarged wall portion 122 defines a shoulder surface 124 against which section 116 comes to rest. An annular chamber 126 is made gas-tight by a pair of O-rings 128, 130 for a purpose to be subsequently described.

Primary chamber 110 has a closed end wall 132 and an open end wall or outlet 134. A passageway 136 in wall 132 is coupled through inlet means 138 to the flexible pipe 30.

Lower section 116 defines a secondary chamber 140 having a closed end wall 142 and an open end wall 144. Open walls 134 and 144 have a common boundary 146. Boundary 146 is a circular surface having an area adequate to substantially instantaneously release the high-pressure gases from the primary chamber 110.

Extending through the cylindrical wall of secondary chamber 140 to the outside of housing 112 are a plurality of discharge ports 148 symmetrically disposed relative to the longitudinal axis of housing 112. In the preferred embodiment four such discharge ports 148 are provided having a shape as shown in FIG. 6.

Slidably mounted within secondary chamber 140 is a piston 150 having a bottom face 152, an upper face 154, and a cylindrical side wall 156. A pair of sealing means 158, 160 make secondary chamber 140 fluid tight. Seal 158 is a U-cup seal for the nitrogen in chamber 140 and seal 160 is a rod-wiper seal for the ambient water medium. Both seals are greased. To reduce the weight of piston 150 the inside thereof is made hollow. Piston 150 is provided with an extending annular shoulder 162 which forms a metal-to-metal seal at 164 with throat 120 of upper section 114.

The closed end wall 142 of lower section 116 is provided with a nose cone section 170 threadedly secured to section 116 as at 172. Sections 116 and 170 define inwardly a control chamber 174 which is rendered gas tight by an O-ring 176. Mounted externally to the end wall 142, inside control chamber 174, is a valve, generally designated as 178, including a check valve 182 which controls the gas flow through an orifice 180 which establishes communication between chambers 140 and 174 in the direction of the arrows 184.

Gas inlet means 190 extends through a portion of the closed end wall 132 thence outwardly of section 114 through a conduit 192, throat 122 and into the annular channel 126. Communicating between channel 126 and chamber 174 is a passageway 194. In the preferred embodiment the gas employed for confinement within control chamber 174 is an inert gas, preferably nitrogen.

In operation of the preferred gas exploder 100, a charge of a combustible gas mixture is admitted through the flexible pipe 30, gas inlet means 138 and into the primary chamber 110. The charged is admitted while piston 150 is in its fully closed position as shown in FIG. 4. When fully charged, the combustible mixture inside primary chamber 110 is at a pressure of say 50 psi. The pressure of the nitrogen in secondary chamber 140 is then also at a pressure of say 50 psi. Since the effective area of the piston's bottom surface 152 is relatively larger than the effective area of boundary 146, a net upwardly directed force is exerted on piston 150 to cause it to sealingly engage upper section 114 at seal 164. Should the pressure of the combustible charge inside primary chamber 110 exceed the desired pressure level, seal 164 will slightly open to allow the pressure inside chamber 110 to drop to the desired level. Piston 150 therefore acts as a control valve. In this manner substantially equal amplitude, output acoustic pulses can be repeatedly obtained without necessitating external control valves and accessory control circuits.

At the instant when the combustible gas mixture in primary chamber 110 becomes detonated by the detonating wave transmitted through flexible pipe 30, seal 164 is opened by the rapidly accelerated piston 150 along the cylindrical surface 156. Piston 150 comes to its fully open position as shown in FIG. 5.

Outlet 134 of primary chamber 110 then establishes fluid communication with the surrounding water medium through the discharge ports 148. The release of the high-temperature, high-pressure gases from the primary chamber 110 generates a high-intensity acoustic pulse in the water medium surrounding exploder 100.

While accelerating downwardly, piston 150 causes the nitrogen gas in secondary chamber 140 to become highly compressed thereby preventing the piston from physically contacting end wall 142. The nitrogen gas acts as a highly non-linear bias spring, i.e., its pressure increases as a power of the piston's displacement. From its position as shown in FIG. 5, piston 150 becomes accelerated upwardly by the nitrogen "-spring," when the pressure level of the exhausted gases has sufficiently decreased. The cooling of housing 112 creates a partial vacuum in chamber 110. During exhaust, the pressure inside the exploder 100 prevents the surrounding water from entering the primary chamber 110 when piston 150 is disengaged from seal 164. A complete cycle of operation takes place very rapidly, in a matter of a few seconds, and another cycle can be repeated in a manner previously described to provide into the water medium a series of acoustic pulses of substantially equal intensity.

The flexible gas supply system of FIG. 1 allows the gas exploder 100 to be built with only one moving part, piston 150, and the vibrations set up by the successive seismic "shots" or detonations inside combustion chamber 110 will not affect the continuous supply of (1) the combustible gas mixtures and (2) the detonation waves through the flexible pipe 30.

While the invention has been described with reference to a preferred embodiment, modifications thereof will become apparent to those skilled in the art and all such modifications are intended to be covered as fall within the scope of the appended claims.

What I claim is:

1. A seismic gas exploder for abruptly releasing high-pressure gases into a liquid medium surrounding said exploder, said exploder comprising;

a housing defining a combustion chamber and a secondary chamber, said housing being rigid to prevent the transmission of mechanical energy into said liquid medium;

a gas supply system for periodically supplying to said combustion chamber a charge of a combustible gas mixture under pressure, said supply system including ignition means for detonating said mixture in said combustion chamber, a movable piston sealing off said combustion chamber from said secondary chamber and from said liquid medium when said piston is in its stable biased position, thereby allowing said gas mixture to become confined under pressure within said combustion chamber;

a gas discharge path through said housing for establishing fluid communication between the volume of said combustion chamber and said liquid medium;

said combustible gas mixture upon becoming ignited moving said piston away from said stable biased position to an unstable biased position thereby expanding the volume of said combustion chamber and reducing the volume of said secondary chamber, the substantially instantaneous removal of said piston from its stable position allows the abrupt application of a high-pressure gas wave through said path into said liquid medium, thereby generating a powerful acoustic pulse in said liquid medium; and bias means in said secondary chamber to:

1. maintain said piston in its stable position,
2. cushion the impact of said piston on said housing, and
3. urge said piston from its unstable position to its stable position following the release of said high-pressure gas wave into said liquid medium by said combustion chamber.

2. The seismic gas exploder of claim 1 wherein said gas supply system includes a flexible metallic conduit for supplying to said combustion chamber said combustible gas mixture, and said ignition means provide a detonating wave for transmission by said flexible conduit to said combustion chamber thereby causing the detonation of said combustible gas mixture in said combustion chamber.

3. The seismic gas exploder of claim 1 wherein said housing includes an upper section and a lower section fixedly attached to said upper section, and said upper section defining a seal area for sealingly engaging said piston when said piston is in its stable biased position.

4. The gas exploder of claim 3 wherein said gas discharge path includes an outlet from said combustion chamber, and a plurality of discharge ports extending through the outer wall of said housing and in communication with said outlet.

5. The gas exploder of claim 1 wherein said bias means define a control chamber confining an gas under pressure for exerting against said piston a bias force causing said piston to maintain said stable biased position, and said inert gas becoming compressed when said piston moves from its stable biased position to its unstable biased position.

6. The gas exploder of claim 5 wherein said inert gas is nitrogen.

7. The gas exploder of claim 6 wherein said bias means include a uni-directional gas conducting valve, and a nitrogen conduit coupled to said valve for supplying nitrogen to said secondary chamber.

8. The gas exploder of claim 7 having first inlet means for coupling said gas supplying system to said gas exploder, and second inlet means for coupling a source of nitrogen to said nitrogen conduit.

9. The gas exploder of claim 1 wherein said piston is hollow and has a relatively extended cylindrical side wall, and said secondary chamber has a cylindrical surface for slidably supporting said piston.

10. The gas exploder of claim 9 wherein the interface between the cylindrical wall of said piston and the cylindrical wall of said secondary chamber includes sealing means to maintain said secondary chamber fluid tight.

11. The gas exploder of claim 10 wherein said sealing means are greased to reduce sliding friction between said piston and the wall of said secondary chamber.

12. The seismic gas exploder of claim 3 wherein said upper and lower sections are constructed so that their adjacent end portions become threadedly interengageable to form a fixed joint therebetween.

* * * * *